3,776,920
2-(N-2-CYANOETHYLDITHIOCARBAMYL-
METHYLENE)BENZIMIDAZOLES
John Joseph D'Amico, Akron, Ohio, assignor to
Monsanto Company, St. Louis, Mo.
No Drawing. Filed Feb. 22, 1972, Ser. No. 228,369
Int. Cl. C07d 49/38
U.S. Cl. 260—309.2                                    5 Claims

ABSTRACT OF THE DISCLOSURE 2-(N-2 - cyanoethyldithiocarbamylmethylene)benzimidazoles are disclosed which are toxicological agents for the control of bacteria and fungi.

This invention relates to 2-(N-2-cyanoethyldithiocarbamylmethylene)benzimidazoles which are useful for controlling bacteria and fungi.

SUMMARY OF THE INVENTION

The compounds of this invention are characterized by the formula

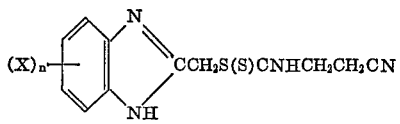

in which X is hydrogen, lower alkyl, lower alkoxy, chloro, bromo, iodo, fluoro, or nitro and $n$ is one or two. The benzene ring may be substituted in the 4, 5, 6 or 7 positions, however, X is preferably hydrogen. Lower alkyl means branched or straight chain alkyl of 1–4 carbon atoms but lower alkyl and lower alkoxy radicals of 1 or 2 carbon atoms are preferred.

The compounds are prepared by reacting the ammonium salt of 2-cyanoethyldithiocarbamic acid with the appropriate 2 - (chloromethyl)benzimidazole. The 2 - (chloromethyl)benzimidazole intermediates are prepared by reacting the appropriately substituted o-phenylenediamine with chloroacetic acid.

Illustrative examples of compounds of the invention are 2-(N-2-cyanoethyldithiocarbamylmethylene)-5-nitro-benzimidazole,
2-(N-2-cyanoethyldithiocarbamylmethylene)-5-chloro-benzimidazole,
2-(N-2-cyanoethyldithiocarbamylmethylene)-4-chloro-benzimidazole,
2-(N-2-cyanoethyldithiocarbamylmethylene)-4-bromo-benzimidazole,
2-(N-2-cyanoethyldithiocarbamylmethylene)-5-bromo-benzimidazole,
2-(N-2-cyanoethyldithiocarbamylmethylene)-5-butyl-benzimidazole,
2-(N-2-cyanoethyldithiocarbamylmethylene)-5-ethoxy-benzimidazole,
2-(N-2-cyanoethyldithiocarbamylmethylene)-5-ethyl-benzimidazole,
2-(N-2-cyanoethyldithiocarbamylmethylene)-5-methoxy-benzimidazole,
2-(N-2-cyanoethyldithiocarbamylmethylene)-4-nitro-benzimidazole,
2-(N-2-cyanoethyldithiocarbamylmethylene)-5-iodo-benzimidazole,
2-(N-2-cyanoethyldithiocarbamylmethylene)-5-fluoro-benzimidazole,
2-(N-2-cyanoethyldithiocarbamylmethylene)-5-6-dibromo-benzimidazole,
2-(N-2-cyanoethyldithiocarbamylmethylene)-5-6-dichloro-benzimidazole,
2-(N-2-cyanoethyldithiocarbamylmethylene)-4-7-diethoxy-benzimidazole,
2-(N-2-cyanoethyldithiocarbamylmethylene)-4-6-difluoro-benzimidazole,
2-(N-2-cyanoethyldithiocarbamylmethylene)-5-6-difluoro-benzimidazole,
2-(N-2-cyanoethyldithiocarbamylmethylene)-4-7-difluoro-benzimidazole,
2-(N-2-cyanoethyldithiocarbamylmethylene)-4-7-diiodo-benzimidazole,
2-(N-2-cyanoethyldithiocarbamylmethylene)-4-5-dimethoxy-benzimidazole,
2-(N-2-cyanoethyldithiocarbamylmethylene)-4-5-dimethyl-benzimidazole,
2-(N-2-cyanoethyldithiocarbamylmethylene)-4-6-dimethyl-benzimidazole,
2-(N-2-cyanoethyldithiocarbamylmethylene)-4-7-dimethyl-benzimidazole,
2-(N-2-cyanoethyldithiocarbamylmethylene)-4-6-dinitro-benzimidazole,
2-(N-2-cyanoethyldithiocarbamylmethylene)-5-6-dibutoxy-benzimidazole, and 2-(N-2-cyanoethyldithiocarbamylmethylene)-5-6-diisopropoxybenzimidazole.

The benzimidazoles are effective bactericides and fungicides and may be applied to the habitat of the pathogen to prevent its growth and spread. Bactericidal or fungicidal compositions containing the toxicant are applied to the area to be protected. If the area is already infected, the toxicant kills or inhibits further growth of the pathogen. If the treated area is pathogen-free, the toxicant keeps the area sterile by inhibiting growth of any pathogen which may invade the area. The term habitat is used in its ordinary dictionary sense meaning the place where the pathogen normally lives and grows. Typically habitats are warm, damp places, for example, locker-room floors or in the case of plant pathogens, the habitat is the foliage of the plant.

Fungicidal compositions are prepared by combining one of the above described toxicants with a liquid or solid carrier. The compounds are insoluble in water but are soluble in organic solvents such as acetone, alcohol, chloroform, benzene, hexane, ethyl acetate and dimethyl formamide. Aqueous dispersions of the toxicants may be prepared to form concentrates which may be diluted with water to form a spray suitable for application to the area to be protected. It is recommended that a dispersing agent be used to facilitate the formation of a more stable emulsion. The toxicants may also be blended with an inert solid diluent such as talc, diatomaceous earth, fuller's earth, etc., to form dry compositions which are applied in the form of dusts or which are dispersed in an aqueous medium to form a liquid spray. In general, any of the conventional formulation and application techniques are applicable with the subject toxicants and includes combinations with the many known wetting agents and inert carriers and includes combinations with other functional biological agents such as herbicides and insecticides.

An advantageous feature of the invention is that the compounds are non-toxic toward plants which means the new toxicants are excellent for protecting plants from bacteria and fungi infection. No phytotoxic effects are exhibited by the compounds at application rates many times greater than necessary for complete control of the microorganism.

The concentration of toxicant used varies depending upon the particular pathogen which the treatment is intended to control. Amounts of one percent to one part per million are effective with dosages of about 100 p.p.m.

being generally used. Of course, it is understood that greater or lesser amounts may be used and that the invention applies to any concentration at which toxic effects or inhibition of the bacteria or fungi is obtained.

DESCRIPTION OF THE PREFERRED EMBODIMENTS

The following synthesis illustrates a satisfactory procedure for preparation of the subject compounds. Any desired benzimidazole may be prepared by selection of the proper chloromethyl benzimidazole intermediate.

To a stirred solution containing 14.1 grams (0.2 mole) of 2-cyanoethylamine dissolved in 300 ml. of acetone and 12.6 grams (0.2 mole) of concentrated ammonium hydroxide, there is added dropwise at 5–15° C., 15.2 grams (0.2 mole) of carbon disulfide. The reaction mixture is stirred at 25–30° C. for one hour. There is then added in one portion 33.3 grams (0.2 mole) of 2-chloromethylbenzimidazole, J. Org. Chem., 4, p. 16 (1939). The reaction mixture is stirred at 25–30° C. for four hours and then 1000 grams of ice is added. After stirring for one hour at 0–10° C., the precipitate which forms is recovered by filtration, washed with water until neutral and air dried at 25–30° C. 2-(N-2-cyanoethyldithiocarbamylmethylene)benzimidazole is obtained in 93% yield which after recrystallization from alcohol melts at 178–180° C. Analysis gives 20.17% N and 23.46% S compared to 20.27% N and 23.20% S calculated for $C_{12}H_{12}N_4S_2$.

To illustrate control of bacteria and fungi, a 1.0% stock solution or emulsion of the test material is prepared in a non-toxic solvent and diluted in agar to provide samples containing various concentrations of the test material. Petri dishes are respectively filled with the test mixture and the plates thus prepared inoculated with the test organism. After a suitable incubation period, the plates are inspected and the concentration is recorded at which complete inhibition of the growth of the organism is obtained. Identical agar test plates with no test material present show normal uninhibited growth.

At test concentrations of 100 p.p.m. (1/10,000 dilution) 2 - (N-2-cyanoethyldithiocarbamylmethylene)benzimidazole completely inhibits the growth of *S. aureus*, *S. typhosa*, and *A. niger*.

Fungicidal activity is further demonstrated by spore germination tests. The toxicant is formulated as aqueous solutions at various concentrations. One drop of the solution is placed in a depression in a glass slide and two drops of a spore suspension of approximately 625,000 spores per ml. of water is added. The slides are stored in a humid atmosphere for 24 hours after which the slides are examined to determine the germination of the spores. 2-(N - 2 - cyanoethyldithiocarbamylmethylene)benzimidazole completely controls (no germination) *Rhizoctonia solani* and *Pythium ultimum* at 3 p.p.m. and *Venturia inaequalis* at 10 p.p.m.

In one embodiment of the invention 2-(N-2-cyanoethyldithiocarbamylmethylene)benzimidazole is applied at a concentration of 100 p.p.m. to foliage of apple seedlings to control apple scab disease caused by *Venturia inaequalis*. Seedlings of uniform size are sprayed with the toxicant and set aside to dry. The next day a spore suspension of *Venturia inaequalis* at a concentration of about 2,500,000 spores per ml. of water is sprayed over the foliage of treated and untreated trees. The plants are kept at 100% humidity for 72 hours and then placed in a greenhouse under normal conditions. Two weeks later the plants are evaluated for apple scab disease. The untreated trees show uninhibited growth of the parasite whereas the treated trees show complete inhibition of the growth of the fungus. Similar results are obtained using other toxicants of this invention. The data demonstrate that the new toxicants are effective for controlling apple scab disease. No herbicidal effects upon the trees are observed even at higher concentrations. In tests against a spectra of broad- and narrow-leafed plants at rates of 25 pounds per acre, the toxicants of this invention exhibit no phytotoxic properties.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula $$(X)_n\text{-benzimidazole-}CCH_2S(S)CNHCH_2CH_2CN$$

in which X is selected from the group consisting of hydrogen, lower alkyl, lower alkoxy, chloro, bromo, iodo, fluoro, and nitro and *n* is one or two.

2. The compound of claim 1 in which *n* is one.
3. The compound of claim 2 in which X is hydrogen.
4. The compound of claim 2 in which X is nitro.
5. The compound of claim 2 in which X is chloro.

References Cited
FOREIGN PATENTS

| | | | |
|---|---|---|---|
| 975,165 | 11/1964 | Great Britain | 260—309.2 |
| 1,228,108 | 4/1971 | Great Britain | 260—309.2 |

OTHER REFERENCES

Brown et al., Chem. Abst., vol. 68, No. 78285v (1968), QD1.A51.

Schorr et al., Chem. Abst., vol. 73, No. 56094h (1970), QD1.A51.

NATALIE TROUSOF, Primary Examiner

U.S. Cl. X.R.

424—273